United States Patent [19]
Kuhlmann

[11] Patent Number: 4,610,088
[45] Date of Patent: Sep. 9, 1986

[54] MOTOR-DRIVEN COMPASS SAW WITH SAW BLADE HOLDER

[75] Inventor: Gerhard Kuhlmann, Stuttgart, Fed. Rep. of Germany

[73] Assignee: Robert Bosch GmbH, Stuttgart, Fed. Rep. of Germany

[21] Appl. No.: 738,733

[22] Filed: May 29, 1985

Related U.S. Application Data

[63] Continuation of Ser. No. 540,612, Oct. 7, 1983, abandoned.

[30] Foreign Application Priority Data

Dec. 8, 1982 [DE] Fed. Rep. of Germany ....... 3245420

[51] Int. Cl.$^4$ ............................................. B23D 49/04
[52] U.S. Cl. ..................................... 30/372; 403/322
[58] Field of Search ................. 30/392, 393, 337, 338; 83/698; 403/321, 322, 361; 279/1 R, 9 R, 29, 80, 82, 83, 89, 90, 93

[56] References Cited

U.S. PATENT DOCUMENTS

| | | | |
|---|---|---|---|
| 2,621,685 | 12/1952 | Butz | 83/698 X |
| 3,750,283 | 8/1973 | Hoffman | 30/392 X |
| 3,890,708 | 6/1975 | Bauer | 30/393 |
| 4,365,397 | 12/1982 | Felpel | 30/392 X |

FOREIGN PATENT DOCUMENTS 681687 10/1952 United Kingdom ................. 279/93

Primary Examiner—Douglas D. Watts
Attorney, Agent, or Firm—Michael J. Striker

[57] ABSTRACT

In a hand-held motor-driven compass saw, the end of the reciprocating rod is connected to the end of the saw blade by means of a clamping member. The reciprocating rod has a U-shaped cross-section whereby it defines a relatively flat recess into which the end of the saw blade is inserted. The end of the reciprocating rod and the end of the saw blade are surrounded by a protective shield. The clamping member may be displaced along the end portion of the reciprocating rod from outside of the shield so as to release the clamping member or to lock it on the end of the reciprocating member when the saw blade is inserted into the recess formed in the U-shaped reciprocating rod.

10 Claims, 3 Drawing Figures

U.S. Patent  Sep. 9, 1986  4,610,088

MOTOR-DRIVEN COMPASS SAW WITH SAW BLADE HOLDER

This is a continuation of application Ser. No. 540,612, filed Oct. 7, 1983, abandoned.

BACKGROUND OF THE INVENTION

The present invention pertains to motor-driven saws, particularly to a hand-held compass saw.

Compass saws in which reciprocating rods are round-shaped shafts are known. One of such saws is described in the German Patent Publication No. DE-05 30 299. In the known arrangements, the coulisse which drives the reciprocating rod connected to the saw blade is usually employed, and it is necessary to provide a guidance in the coulisse for the reciprocating rod, in order to ensure the correct position of the saw blade connected to the end of the reciprocating rod in the direction of the saw cut. Such reciprocating shafts with such guiding coulisses are relatively heavy. Furthermore, they are expensive in manufacturing because a precise adjustment of the guiding box for the reciprocating rod with the slide guide of the coulisse must be ensured. This costly manufacturing makes the compass saw even more expensive. The heavy weight of the round reciprocating rod and of the guide components of the coulisse stipulate high oscillating masses resulting in respective loads on the parts for driving and guiding the reciprocating rod.

German No. DE-GbM 77 10 558 discloses a saw with a reciprocating rod formed of a relatively flat material and installed in the assembly in the plane perpendicular to the plane of the saw blade. Such a reciprocating rod is usually formed integrally with a coulisse, which serves for its driving. In order to be able to transmit a work pressure to the saw without deforming the reciprocating rod, the latter must be very robust, e.g. sufficiently wide and thick. The saw clamping device arranged on the reciprocating rod must seize the saw blade extended perpendicularly to the plane of the reciprocating rod and therefore, should also be comparatively large and heavy and a transition from the plane of the reciprocating rod to the plane of the saw blade should be handled also. Furthermore, in these conventional arrangements, forces caused by heavy masses occur. Finally, another disadvantage of conventional compass saws resides in that the end of the reciprocating rod is exposed to the hands of the operator, which is undesired. The application of the protective shields has not been successful because the known constructions of the holders at the ends of the reciprocating rods precluded the installation of the protective shields for operation with the saw blades.

SUMMARY OF THE INVENTION

It is an object of the present invention to provide an improved motor-driven compass saw.

It is a further object of the invention to provide a saw, which has a stable and at the same time light reciprocating rod.

It is another object of the invention to reduce manufacturing costs of the saw.

It is still another object of the invention to provide a reliable and sample clamping of the saw blade in the motor-driven saw.

These and other objects of the invention are attained by a motor-driven compass saw, particularly hand-held saw, comprising an elongated reciprocating rod of a relatively flat material; a blade saw having an end portion; and a clamping member on said reciprocating rod, said reciprocating rod having an end facing said saw blade and having, at least in the region of said end, a U-shaped profile defining two parallel legs and a recess therebetween adapted to receive said end portion of the saw blade and to align the latter in the feeding direction, said clamping sleeve being adapted to rigidly secure said end portion inserted into said recess to the end of said reciprocating rod.

The U-shaped profile provides for a very stable and light reciprocating rod.

The clamping member may be slidably positioned on the end of the reciprocating rod.

The clamping member may be a sleeve surrounding the reciprocating rod and having a radical bore, and may further include a screw inserted in said bore and connected to the back of the U-shaped profile.

The recess between said legs may be open in the direction of feeding of the saw blade.

The length of said recess may be insignificantly shorter than the width of the end portion of the saw blade.

The saw may further include a protective shield surrounding the end of the reciprocating rod and the end portion of the saw blade.

The shield may be formed with an elongated slot for observing a cut made by the saw blade, the width of said slot being dimensioned so as to pass therethrough a wrench, which is engageable with said screw for displacing the clamping member on the end of the reciprocating rod and releasing and locking the clamping member on said rod.

The reciprocating rod, in the vicinity of its end, may be formed with a transverse slot made in the base of said recess, said end portion of the saw blade having at least one side pin, which is received in said slot upon insertion of the saw blade into said recess.

The reciprocating rod may include a stop projection, which stops said clamping member in its displacement on the rod so that the clamping sleeve can not be pulled out from the reciprocating rod.

According to a further feature of the present invention, the reciprocating rod may be formed with a recess, which receives a coulisse inserted thereinto.

The coulisse may be glued, or soldered, or welded, or otherwise rigidly connected to the reciprocating rod.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
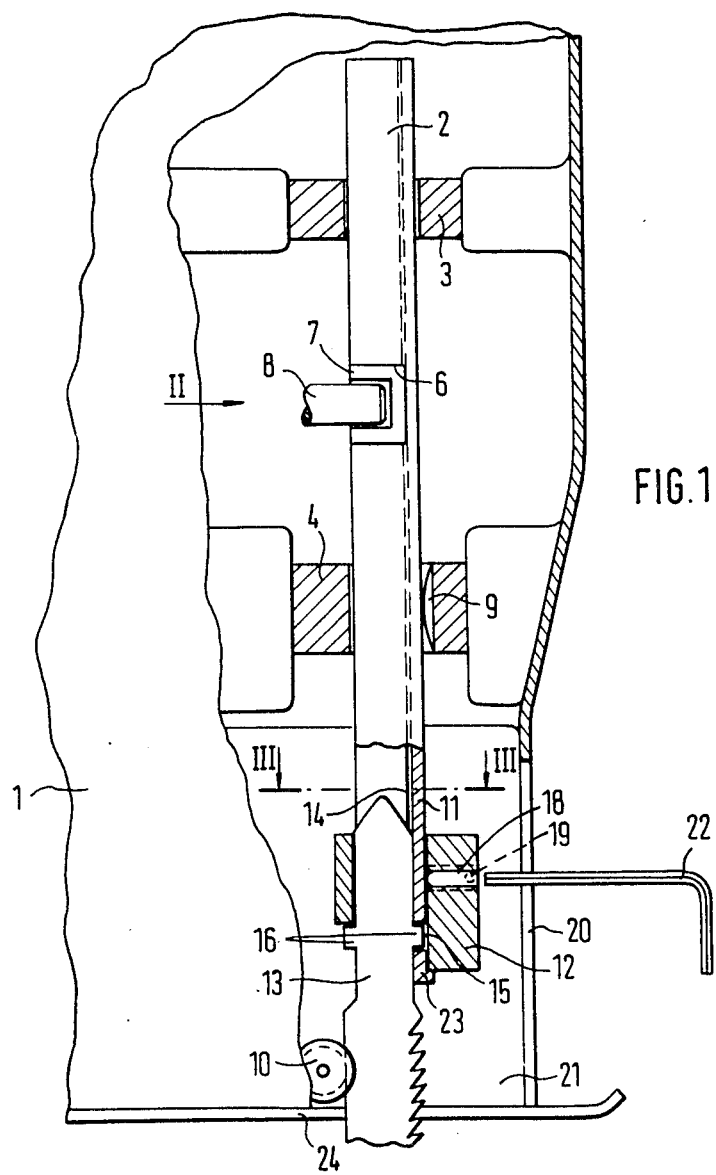
FIG. 1 is a partial side view of the motor-driven hand-held compass saw, according to the invention, partially in section.

The compass saw according to the invention includes a housing 1 in which a reciprocating rod designated by reference character 2 is accommodated. Rod 2 is guided in an upper bearing 3 and a lower bearing 4. The reciprocating rod 2 has a relatively flat cross section, which has a U-shaped profile. The U-shaped profile of the reciprocating rod is formed by two parallel legs 5, which are spaced from each other to form a recess therebetween.

Figure 2:
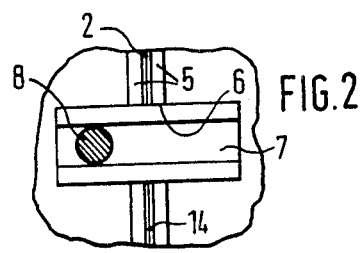
FIG. 2 is a view from arrow II of FIG. 1.
Figure 3:
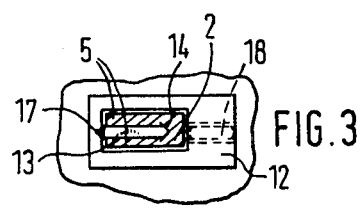
FIG. 3 is a sectional view along line III—III of FIG. 1.

A recess 6 is formed in the reciprocating rod 2 between the bearings 3 and 4. A coulisse 7 shown in detail in FIG. 2 is inserted into recess 6 and is therein rigidly secured to the rod 2 by glueing, soldering, or welding. An eccentric pin 8 driven by a motor (not illustrated herein) in the conventional fashion, is engaged in coulisse 7 and thereby, the motion of the pin is transmitted through coulisse 7 to the reciprocating rod 2. A leaf spring 9, which is inserted in the lower bearing 4, gives sufficient play in the feeding direction to the reciprocating rod 2 for an eventual pendulum motion thereof through a roll 10.

The end 11 of the reciprocating rod carries a sleeve-like clamping member 12 surrounding the end of the rod. The distance between the legs 5 of the U-shaped profile is so selected that an end 13 of the saw blade can be inserted into the recess formed between those legs. The saw blade is inserted into the end of the U-shaped reciprocating rod 2 so that the narrower side of the saw blade, at the extension of which the saw teeth are arranged, thrusts against a V-shaped base portion 14 forming the base of the recess between two parallel legs 5.

The reciprocating rod 2 is formed at its end with a slot 15 extended transversally to the elongation of the rod and open at the rear wall thereof to receive and engage one of the side pins on projections 16 formed on the end of the saw blade. The length of legs 5 forming the U-shaped profile of rod 2 is insignificantly shorter than the width of the saw blade end 6. Therefore, in assembly, the backward narrow side of the saw blade end 13 overlaps insignificantly the recess between the legs so that this backward side can press against a V-shaped groove 17 formed in the clamping member 12.

The clamping member 12 is formed with a threaded bore extended radially outwardly from its inner openning. A screw 18 having an inner hexagonal recess 19 to receive a wrench 22 therein is inserted into that threaded bore. Screw 18 is directed towards the rear wall of the reciprocating rod 2 and is located behind a slot 20 formed in a protective shield 21, which surrounds the end 11 of the reciprocating rod and the end of the saw blade clamped in the clamping member 12. The wrench 22 is passed through slot 20 and inserted into recess 19 of screw 18. The clamping sleeve-like member 12 is also formed with a radially projecting stop 23, which prevents the clamping member from being pulled out from the reciprocating rod 2.

Reference numeral 24 denotes a plate or guide shoe, which is placed on the workpiece.

The internal openings of bearings 3 and 4 are adjusted to the cross-section of the reciprocating rod 2 so that unobjectionable guidance of the reciprocating rod 2 and of the saw blade in the plane of the saw blade is ensured.

For engaging and disengaging of the end 13 the saw blade from the end of the reciprocating rod, wrench 22 is inserted into slot 20 and is passed therethrough into the hexagonal recess of screw 18. Upon rotation of screw 16, clamping member 12 can be either locked on the reciprocating rod or released from it so that clamping member 12 can be displaced up and down along the reciprocating rod by wrench 22. If it is necessary to clamp the end of the saw blade in clamping member 12, the latter is first displaced upwardly. Then, the saw blade end 13 is inserted into the recess between legs 5 of the U-shaped reciprocating rod so that one of the two projections 16 is engaged in the transversal slot 15. Then, the clamping member 12 is moved by wrench 22 in the downward direction unless member 12 abuts with its lower surface against another pin 16 at one side and against stop 23 at the other side. The clamping member 12 is in this position clamped on the reciprocating rod by rotation of screw 18. Release of the saw blade is performed by releasing of the screw 18 and displacing the clamping member 12 upwardly up to the position in which the end of the saw blade is released and it can be taken out from the recess of the U-shaped reciprocating rod.

The compass saw constructed in the above described manner has very small oscillating masses, provides a simple but secure lock of the saw blade and ensures a precise and stable guiding of the saw blade during operation.

The provision of the saw with the protective shield makes it possible that a saw blade can be quickly exchanged for a new one.

It is, of course, understood that protective shield 21 can be manufactured of a transparent material. In such a case, the elongated slot suitable for the observation of the cut by an operator is no longer required. Thus, a shorter slot-like opening for passing therethrough the wrench 22 and displacing and clamping of the clamping member 12 would be sufficient.

It will be understood that each of the elements described above, or two or more together, may also find a useful application in other types of motor-driven saws differing from the types described above.

While the invention has been illustrated and described as embodies in a motor-driven saw, it is not intended to be limited to the details shown, since various modifications and structural changes may be made without departing in any way from the spirit of the present invention.

Without further analysis, the foregoing will so fully reveal the gist of the present invention that others can be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A motor-driven compass saw, particularly a hand-held saw, comprising a blade saw having an end portion;

an elongated reciprocating rod of a relatively flat material and having an end facing said saw blade, said reciprocating rod having at least in the region of said end a U-shaped profile with two parallel legs which form a recess therebetween adapted to receive said end portion of said saw blade and to align the latter in the feeding direction, and with a transverse rear wall which connects said legs with one another;

a clamping sleeve surrounding said reciprocating rod and being slidably positioned on said end of said reciprocating rod, said clamping sleeve having a radial bore;

and a screw extending through said bore of said clamping sleeve and abutting against said rear wall of the U-shaped profile of said end of said reciprocating rod without passing through said rear wall, so that said clamping sleeve rigidly secures said end portion inserted into said recess to the end of said reciprocating rod upon tightening of said screw, said reciprocating rod in the vicinity of its end being formed with a transverse slot made in the base of said recess, said end portion of the saw blade having at least one side pin, which is received in said slot upon insertion of the saw blade into said recess.

2. The saw as defined in claim 1, wherein said recess between said legs is open in the direction opposite to the direction of feeding of the saw blade.

3. The saw as defined in claim 1, wherein said shield is formed with an elongated slot for observing a cut made by the saw blade, the width of said slot being dimensioned so as to pass therethrough a wrench, which is engageable with said screw for displacing clamping member on the end of the reciprocating rod and releasing and locking the clamping member on said rod.

4. The saw as defined in claim 1, wherein the base of said recess has a V-shaped surface.

5. The saw as defined in claim 1, wherein said clamping sleeve has an inner surface facing the open side of said recess, said surface being V-shaped.

6. The saw as defined in claim 1, wherein said reciprocating rod includes a stop projection, which stops said clamping member in its displacement on the rod so that the clamping sleeve can not be pulled out from the reciprocating rod.

7. The saw as defined on claim 1, wherein said reciprocating rod is formed with a recess, which receives a coulisse inserted thereinto.

8. The saw as defined in claim 7, wherein said coulisse is glued to the reciprocating rod in said recess.

9. The saw as defined in claim 7, wherein said coulisse is soldered to the reciprocating rod in said recess.

10. The saw as defined in claim 7, wherein said coulisse is welded to the reciprocating rod in said recess.

* * * * *